United States Patent
Nunnally et al.

(10) Patent No.: US 7,107,820 B2
(45) Date of Patent: Sep. 19, 2006

(54) INTEGRATED GAS SUPPLY AND LEAK DETECTION SYSTEM

(75) Inventors: David W. Nunnally, Greenfield, IN (US); Douglas J. Gifford, Brownsburg, IN (US)

(73) Assignee: Praxair S.T. Technology, Inc., Danbury, CT (US)

( * ) Notice: Subject to any disclaimer, the term of this patent is extended or adjusted under 35 U.S.C. 154(b) by 0 days.

(21) Appl. No.: 10/429,205

(22) Filed: May 2, 2003

(65) Prior Publication Data

US 2004/0216514 A1    Nov. 4, 2004

(51) Int. Cl.
*G01M 3/04* (2006.01)

(52) U.S. Cl. .......................................... 73/40
(58) Field of Classification Search ............... 73/40, 73/49.2, 40.7
See application file for complete search history.

(56) References Cited

U.S. PATENT DOCUMENTS

| | | | | |
|---|---|---|---|---|
| 3,509,758 A | * | 5/1970 | Newman | 73/49.2 |
| 3,792,607 A | * | 2/1974 | Fukuda | 73/49.3 |
| 4,172,477 A | * | 10/1979 | Reich | 73/40.7 |
| 4,571,986 A | * | 2/1986 | Fujii et al. | 73/49.1 |
| 4,670,847 A | * | 6/1987 | Furuse | 73/52 |
| 4,715,214 A | * | 12/1987 | Tveter et al. | 73/49.2 |
| 4,766,763 A | * | 8/1988 | Kurtz | 73/49.2 |
| 5,065,350 A | * | 11/1991 | Fedder | 73/40 |
| 5,279,147 A | * | 1/1994 | Bertini et al. | 73/40 |
| 5,336,053 A | * | 8/1994 | Wynkoop | 73/40 |
| 5,450,883 A | * | 9/1995 | Payne et al. | 73/40.5 R |
| 5,540,083 A | * | 7/1996 | Sato et al. | 73/40 |
| 5,715,786 A | * | 2/1998 | Seiberth | 73/49.1 |
| 6,167,751 B1 | * | 1/2001 | Fraim et al. | 73/49.3 |
| 6,182,501 B1 | * | 2/2001 | Furuse et al. | 73/49.2 |
| 6,412,334 B1 | * | 7/2002 | Kral et al. | 73/40 |

* cited by examiner

*Primary Examiner*—Hezron Williams
*Assistant Examiner*—John Fitzgerald
(74) *Attorney, Agent, or Firm*—Gerald L. Coon

(57) ABSTRACT

The invention generally relates to a system and method for integrated gas delivery and leak detection to one or more applications. The system includes at least one application site, a process conduit extending from a process gas source site to the application site, a first and second process flow control at the process conduit, and a first pressure sensor.

Also included in the system is a microprocessor that is in electronic communication with the flow controls and the first pressure sensor, wherein the microprocessor is programmed to respond to an application standby request by performing a pressure decay test, including closing the second process flow control and pressurizing a portion of the system by opening the first process flow control. Further included in the pressure test is closing the first process flow control when the pressure at the first pressure sensor is at a minimum pressure, and comparing an empirical pressure decay rate at the first pressure sensor with a maximum pressure decay rate, whereby an empirical pressure decay rate that exceeds the maximum pressure decay rate indicates the presence of a leak.

42 Claims, 11 Drawing Sheets

INTEGRATED GAS SUPPLY AND LEAK DETECTION SYSTEM

BACKGROUND OF THE INVENTION

Hazardous and expensive gases are used in many manufacturing systems. For example, gases such as hydrogen, helium, oxygen, fluorine, nitrogen, carbon monoxide, nitrous oxide, hydrogen fluoride, arsenic hexafluoride, and the like are used as process gases in a variety of manufacturing situations, for example, etching or chemical vapor deposition in semiconductor processing, gas metal arc welding, chemical manufacturing, petroleum refining, thermal spray coating, and the like. A significant problem is delivering these gases to applications in a manufacturing environment while detecting and mitigating leaks. Even small amounts of leakage can be hazardous, for example, the explosive limit for hydrogen gas at standard temperature and pressure is about 4% by volume.

There are a number of commercially available gas detectors that can be configured for a variety of gases, but they are costly, particularly if contemplated for use with a gas supply system that is spread over a large area. Also, these detectors provide leak detection only after a detectable amount of gas has leaked and contacted the detector, which can be a significant amount of gas depending on the location of the detector and surrounding air currents. Furthermore, a catastrophic leak may not be detected until a significant amount of gas has been released, for example, if a high-pressure gas delivery line is accidentally severed. In a large system, this can create a safety hazard and waste a significant amount of gas before detection. In response, the sensitivity of the detector can be increased, however, this leads to an increased number of false alarms, which can cause costly downtime and desensitize personnel to real alarms.

An example of a hydrogen supply system exists for supplying hydrogen to a thermal spray application. However, the system only detects a leak after a significant amount of flammable hydrogen gas has already leaked from the system. The system is controlled by a hard-wired relay control system and cannot be easily reconfigured for different process conditions or improved safety protocols. Additionally, the system does not provide redundancy for safety in case of failure of critical components, nor does it provide for automatic calibration and monitoring of critical sensor components. Furthermore, the system can be used with only one application at a time.

Therefore, there is a need in the art for a system and method to supply process gases, in particular hydrogen, to one or more applications in a manufacturing facility. The system must have multiple levels of redundancy for safety and must automate multiple leak detection methods, while at the same time minimizing false alarms. The system must provide for rapid detection and mitigation of catastrophic leaks.

SUMMARY OF THE INVENTION

The invention generally relates to a system and method for integrated gas delivery and leak detection to one or more applications. In particular, the invention is a method and apparatus for delivering a process gas, e.g., $H_2$, and a purge gas, e.g., He, to multiple applications, while integrating multiple methods of leak detection.

An embodiment of the invention is a system for integrated gas delivery and leak detection. The system includes at least one application site, a process conduit extending from a process gas source site to the application site, a first process flow control at the process conduit, and a second process flow control at the process conduit between the first process flow control and the application site.

The system further includes a first pressure sensor, located at the purge conduit between the first purge flow control and the process conduit, or at the process conduit between the first and second process flow controls.

Also included in the system is a microprocessor that is in electronic communication with the first and second process flow controls and the first pressure sensor, wherein the microprocessor is programmed to respond to an application standby request by performing a pressure decay test.

The pressure decay test includes closing the second process flow control and pressurizing a portion of the system by opening the first process flow control. Further included in the pressure test is closing the first process flow control when the pressure at the first pressure sensor is at a minimum pressure.

Also included in the pressure decay test is comparing an empirical pressure decay rate at the first pressure sensor with a maximum pressure decay rate, whereby an empirical pressure decay rate that exceeds the maximum pressure decay rate indicates the presence of a leak. Thus, the system provides integrated gas delivery and leak detection.

Another embodiment of the invention is a system as defined in the previous embodiment, further comprising a purge conduit extending from a purge gas source site to the process conduit between the first and second process flow control, and a first purge flow control means located at the purge conduit. The first pressure sensor is located at the purge conduit between the first purge flow control means and the process conduit, or at the process conduit between the first and second process flow control means. Also, the microprocessor is in electronic communication with the first purge flow control. The pressure decay test includes closing the second process flow control means and pressurizing a portion of the system by opening the first process flow control means and closing the first purge flow control means, or by opening the first purge flow control means and closing the first process flow control means. When the pressure at the first pressure sensor is at a predetermined pressure the microprocessor closes the first process and the first purge flow control means.

Another embodiment of the invention is a method for integrating leak detection in a gas delivery system, wherein the system is defined in either of the two preceding embodiments of the system above. Yet another embodiment is a computer program product for integrating leak detection in a gas delivery system, comprising a computer-usable medium including a computer readable code thereon, wherein the computer readable code includes instructions for causing a microprocessor to conduct the method of the invention on the system of the invention.

The advantages of the embodiments disclosed herein are significant. Practicing the invention can significantly reduce the cost, complexity, and hazards of supplying process gas to one or more applications. By providing leak detection integrated with gas delivery, gas leaks can be mitigated more quickly, resulting in lower costs and halting potentially hazardous situations before they become serious. By providing pressure-based leak testing, the use of costly gas detectors can be minimized. By providing microprocessor control, operator workload is lessened, updated protocols can be incorporated, and the system can respond rapidly to hazards or changing application conditions. By providing a purge gas, leak testing can be conducted with reduced hazard compared to the process gas. By providing multiple leak tests, false alarms are reduced and sensitivity to true alarms is increased, improving safety and reducing operator desensitization to alarms. By providing redundant system components and verification of system components, safety and reliability is increased. By increasing safety, reliability and reducing false alarms, system downtime is reduced, leading to increased productivity.

The combination of these advantages is expected to reduced the cost and increase the safety and of employing process gases in manufacturing.

DETAILED DESCRIPTION OF THE INVENTION

Figure 1:
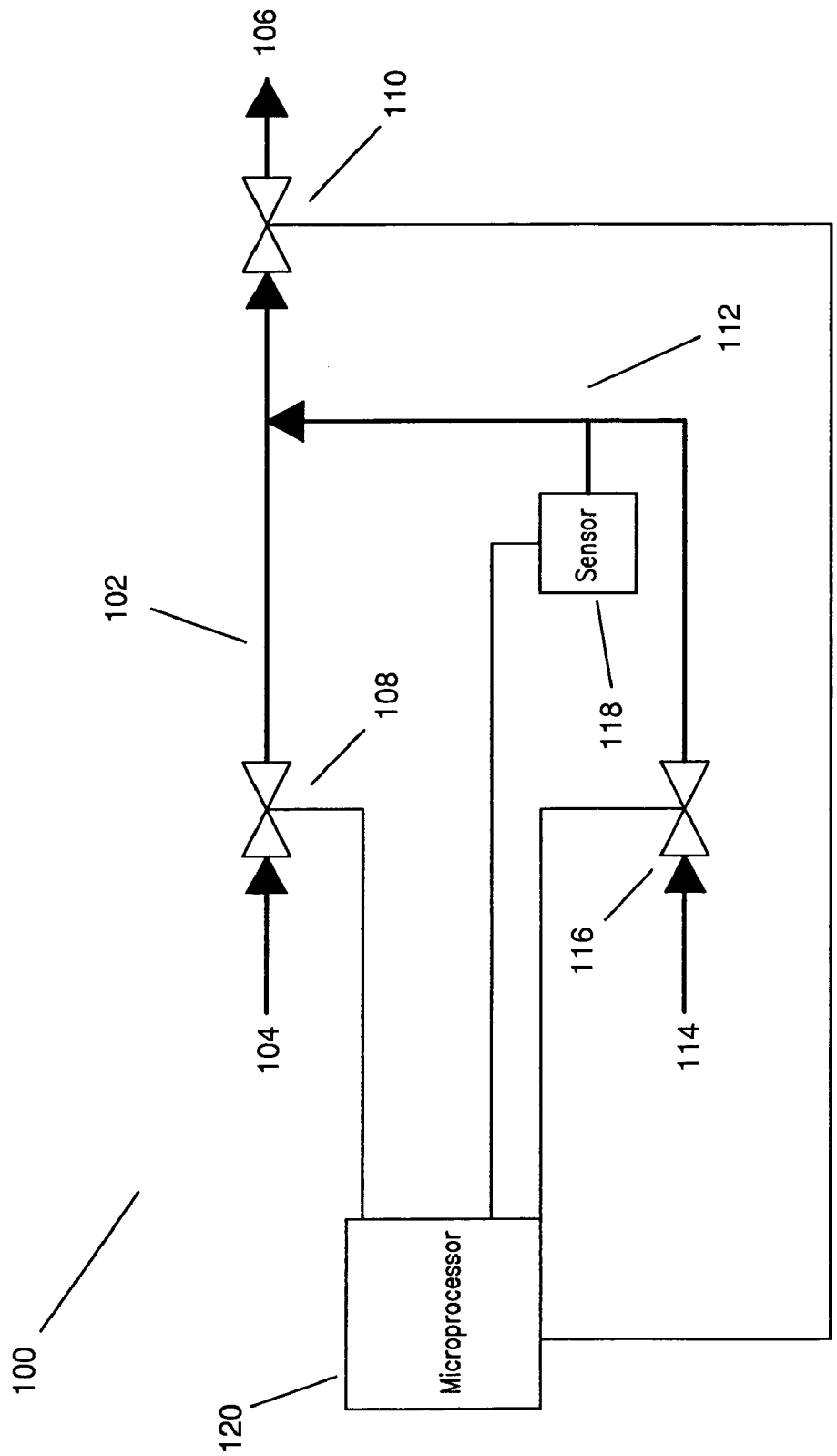
FIG. 1 depicts a system 100 that is an embodiment of the system of the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The invention generally relates to an apparatus and system for integrated gas delivery and leak detection to one or more applications. In particular, the invention is a method an apparatus for delivering a process gas, e.g., $H_2$, and a purge gas, e.g., He, to multiple applications, while integrating multiple methods of leak detection. The present invention is illustrated by the following examples, which are not intended to be limiting in any way.

FIG. 1 is a schematic of one embodiment of the present invention, system 100, which can also be employed to conduct the method of the invention, and which can be operated by the computer program product of the invention. Dark lines with arrows indicate conduits and the typical flow direction of gas in the conduit.

Process gas is carried by process conduit 102, which extends from process gas source site 104 to application site 106, whereby process gas can be directed to site 106. The flow of process gas from site 104 through conduit 102 is controlled by a first process flow control 108 and a second process flow control 110, both located at conduit 102. Control 110 is located between the first flow control 108 and the application site 106.

The apparatus also employs purge gas in purge conduit 112, which extends from purge gas source site 114 to process conduit 102 at a location between the first and second process flow controls 108 and 110. The flow of purge gas from source site 114 is controlled by a first purge flow control 116, which can be located at any point on conduit 112.

System 100 also includes a first pressure sensor 118. Sensor 118 is at, i.e., in barometric communication with, process conduit 102 between flow controls 108 and 110, or at purge conduit 112 between flow control 116 and conduit 102.

System 100 also includes a microprocessor 120. The lines in FIG. 1 connecting microprocessor 120 with flow controls 108, 110, and 116, and with pressure sensor 118 indicate that they are in electronic communication.

Figure 2:
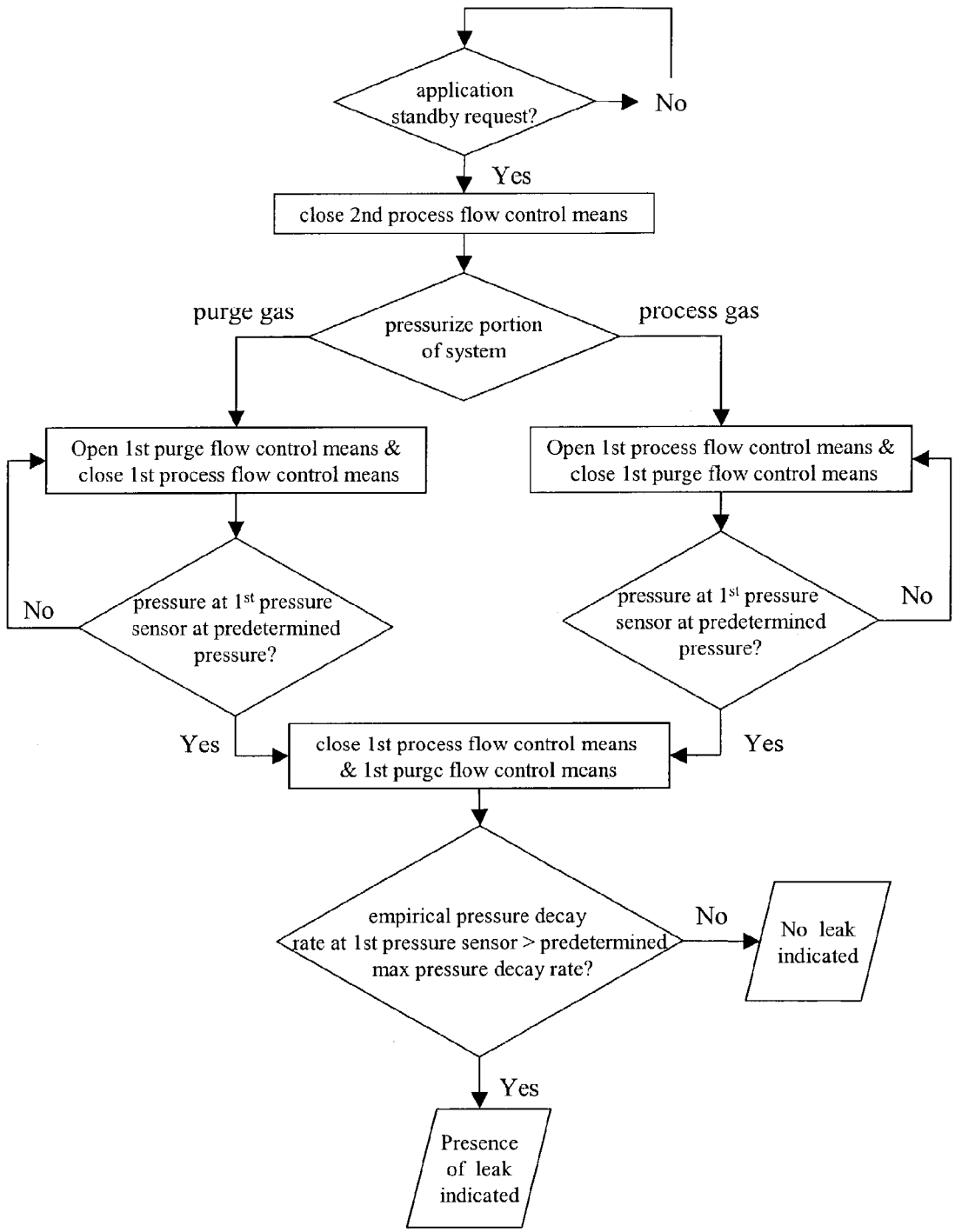
FIG. 2 depicts a flow chart of an embodiment of the method of the invention.

FIG. 2 shows an example of a flow chart of a pressure decay test that microprocessor 120 is programmed to perform in response to an application standby request. Referring to the elements of system 100, the test includes closing second process flow control 110 and pressurizing a portion of the system. Pressurization can be accomplished with process gas by opening first process flow control 108 and closing first purge flow control 116, or with purge gas by opening first purge flow control 116 and closing first process flow control 108.

In system 100, when the pressure at first pressure sensor 118 is at a minimum pressure, flow controls 108 and 116 are closed, i.e., the portion of the system bounded by flow controls 108, 110, and 116 is pressurized. Microprocessor 120 compares an empirical pressure decay rate measured at first pressure sensor 118 with a maximum pressure decay rate. If the empirical pressure decay rate exceeds the maximum pressure decay rate, the presence of a leak is indicated. Thus, the system provides integrated gas delivery and leak detection.

The particular order of steps in FIG. 2 is given for illustration only and is not intended to limit the method to that order. For example, in pressurizing with process gas, the second process flow control and the first purge flow control can be closed simultaneously, instead of stepwise.

Figure 3A:
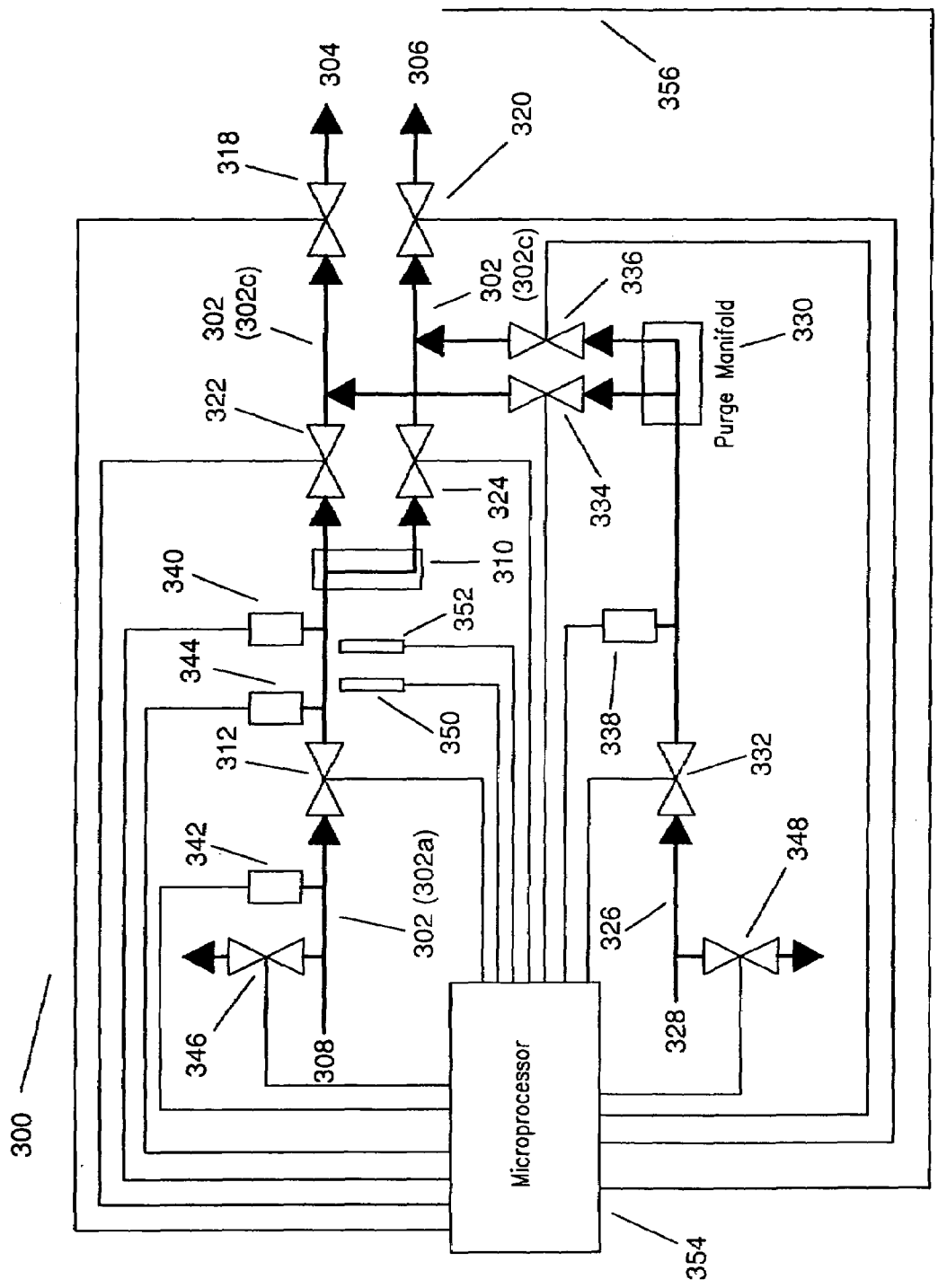
FIG. 3A depicts a system 300 that is a further embodiment of the invention.

FIG. 3A is a schematic of another embodiment, system 300, which can also be employed to conduct the method of the invention, and which can be operated by the computer program product of the invention.

Process gas is carried by process conduit 302 to two or more application sites, 304 and 306. Conduit 302 extends from process gas source site 308 to a process manifold 310, indicated in the Fig. by the boxed area. From manifold 310, conduit 302 splits to extend separately to each of the application sites 304 and 306.

The flow of process gas from site 308 through conduit 302 is controlled by a first process flow control 312 at conduit 302 between process gas source site 308 and process manifold 310. In a preferred embodiment, flow control 312 employs two flow control elements in series, preferably two direct lift pilot operated valves in series.

Figure 3B:
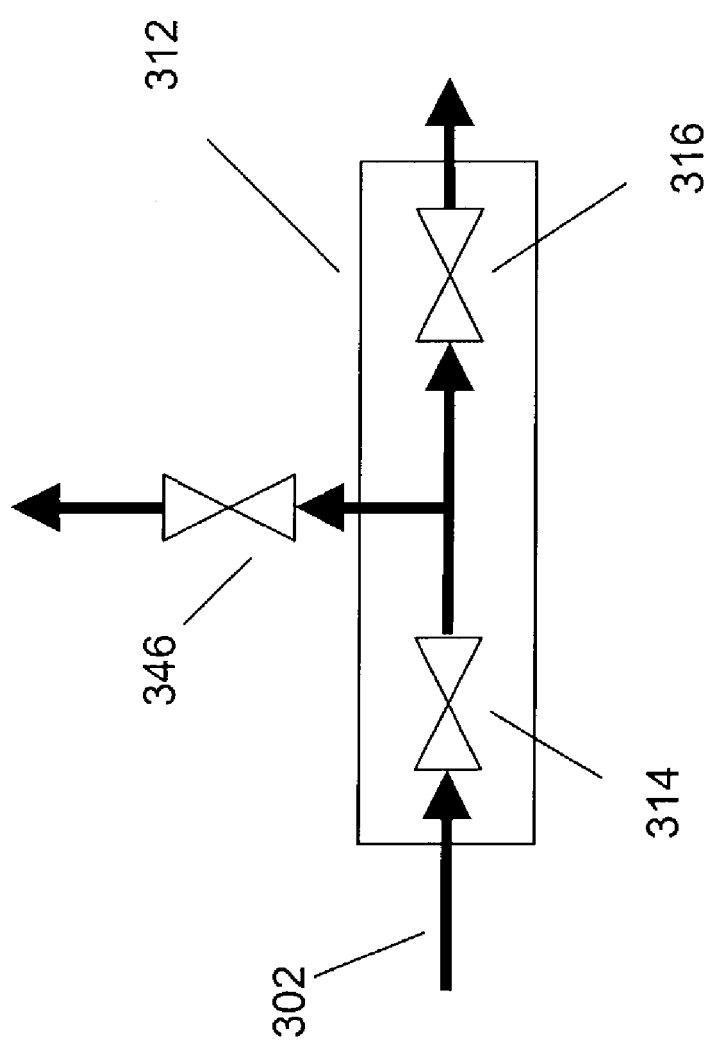
FIG. 3B shows a detail of flow control 312.

FIG. 3B shows a detail of flow control 312, indicated in the Fig. by the box. Inside flow control 312 are two flow control elements 314 and 316 located on conduit 302 in series.

For each of the application sites 304 and 306, there is a second process flow control 318 and 320, respectively, located at conduit 302 between process manifold 308 and each application site. Also for each application site 304 and 306, there is a third process flow control 322 and 324, respectively, located at process conduit 302 between process manifold 308 and the second process flow control 318 and 320, respectively. In a preferred embodiment, third process flow controls 322 and 324 each employ two flow control elements in series, preferably two direct lift pilot operated valves in series.

System 300 also employs purge gas, which is carried by purge conduit 326 to application sites 304 and 306. Conduit 326 extends from purge gas source site 328 to a purge manifold 330, indicated in the Fig. by the boxed area. From manifold 330, conduit 326 splits to extend separately to each separate arm of conduit 302 at a location between the second and third process flow controls, i.e., between 318 and 322 (i.e., conduit 302b), and between 320 and 324 (i.e., conduit 302c), thereby directing purge gas to application sites 304 and 306, respectively.

The flow of purge gas from source site 328 is controlled by a first purge flow control 332, which is located at purge conduit 326 between purge source site 328 and purge manifold 330. In a preferred embodiment, flow control 332 employs two flow control elements in series, preferably two direct lift pilot operated valves in series.

For each of the application sites 304 and 306, there is a second purge flow control 334 and 336, respectively, located at conduit 326 between purge manifold 330 and conduit 302.

System 300 also includes a first pressure sensor 338 at purge conduit 326 between flow control 332 and purge manifold 330, a second pressure sensor 340 at process conduit 302 between manifold 310 and flow control 312, a third pressure sensor 342 at conduit 302 between process gas source site 308 and flow control 312, and a fourth pressure sensor 344 at conduit 302 between flow control 312 and the second pressure sensor 340. In a preferred embodiment, wherein the first and second pressure sensors 338 and 340 each independently employ a pair of pressure transducers in parallel.

System 300 also includes at least one vent flow control located on the process conduit or the purge conduit, for example, as shown by flow controls 346 or 348. Preferably, the system includes at least one vent flow control 346 at the process conduit between process gas site 308 and manifold 310. Even more preferably, the system includes a second vent flow control 348 at purge conduit 326 between purge gas site 328 and purge manifold 330. In a preferred embodiment, each vent flow control is connected to its respective conduit at a location between serial flow control elements in the first process flow control 312 and the first purge flow control 332, respectively. For example, as detailed in FIG. 3B, vent flow control 346 is at conduit 302 between individual serial flow elements 314 and 316 in flow control 312, instead of between 312 and process gas supply site 308 as shown in FIG. 3A.

System 300 also includes at least one process gas detector 352 located external to process conduit 302, preferably at a location between flow control 312 and application sites 304 and 306, and most preferably external to process manifold 310. More preferably, the system includes two or more process gas detectors located external to process conduit 302, each preferably at a location between flow control 312 and application sites 304 and 306.

Additionally, system 300 includes at least one gas temperature sensor 352 located at one of the conduits, wherein the sensor is in thermal communication with the gas in the conduit, whereby the temperature of the gas in the conduit can be measured. Preferably, the temperature sensor is located at process conduit 302, most preferably between flow control 312 and the application sites 304 and 306.

System 300 also includes a microprocessor 354. The thin lines in FIG. 3A indicate that microprocessor 354 is in electronic communication with flow controls 312, 318, 320, 322, 324, 332, 334, 336, 346, 348, 314, 316; with pressure sensors 338, 340, 342, and 344; gas detector 350; and temperature sensor 352. Additionally, microprocessor 354 is in communication with a ventilation system at each application site 304 and 306.

FIGS. 4–10 show flow charts of the steps that can be programmed into microprocessor 354, with reference to other elements in FIG. 3A. The particular order of steps in FIGS. 4–10 is given for illustration only and is not intended to limit the method to that order. For example, the numbering of tests 1 to 13 among FIGS. 6 to 9 is for convenience of reference and does not necessarily indicate a sequence except in a preferred embodiment.

Figure 4:
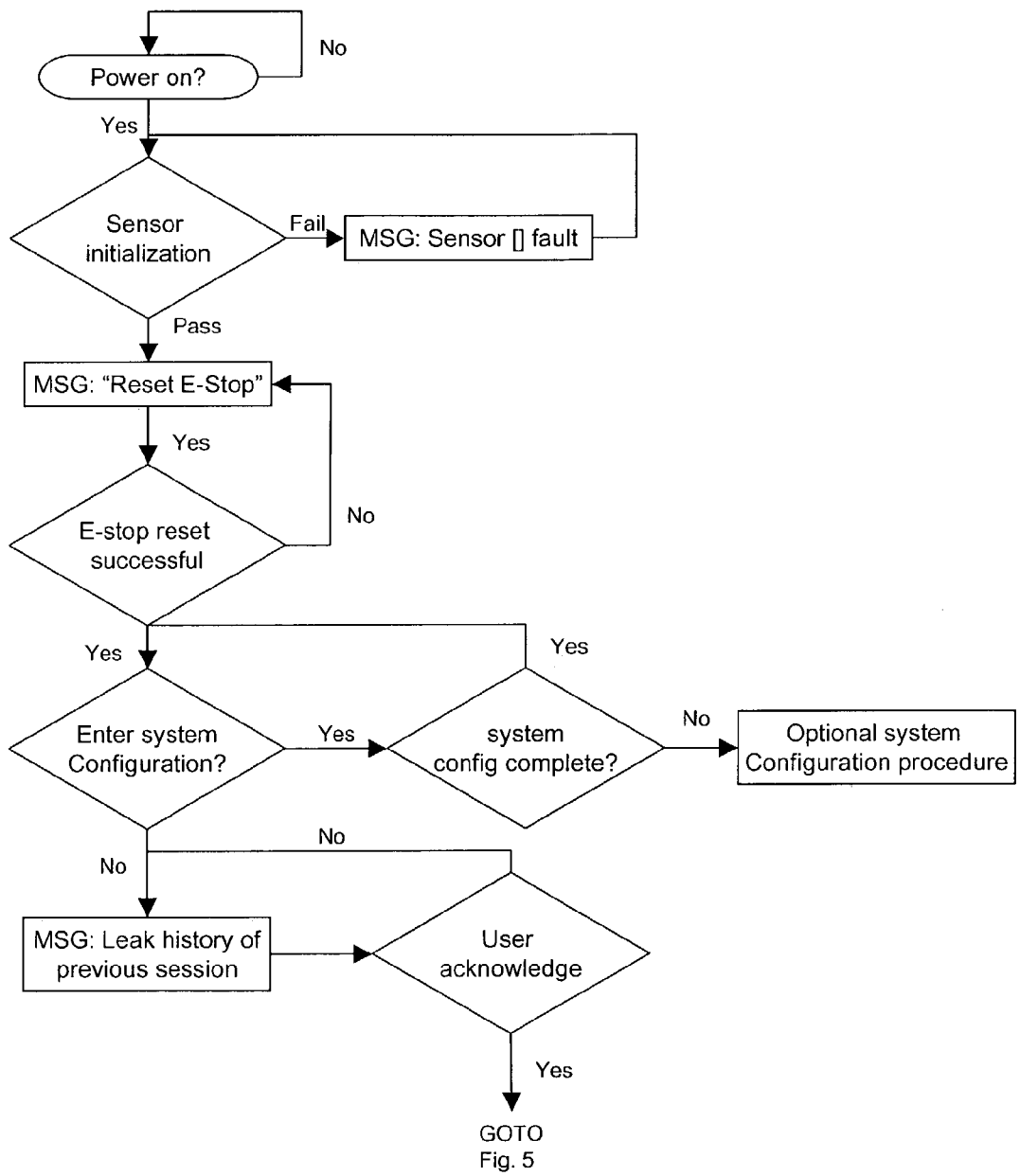
FIG. 4 depicts a flow chart of an initialization portion of the method of the invention.

FIG. 4 shows system start-up/initialization. After power on, the pressure sensors, (e.g., sensors 338, 340, 342, and 344) and the gas detector can be initialized, and a message regarding sensor status, e.g., a sensor fault, can be returned. The system preferably includes an emergency stop (E-Stop) function, whereby an operator can immediately cause the system to enter an emergency mode. During system initialization, the E-Stop activation device, e.g., a button, can be tested. Additionally, an optional system configuration module can be presented, where an authorized user, e.g., a service technician, can review details of the system history, calibration, and settings, perform software updates, and the like. The system can also return a message indicating the system leak history, e.g., any leaks that were detected in a previous session.

Figure 5:
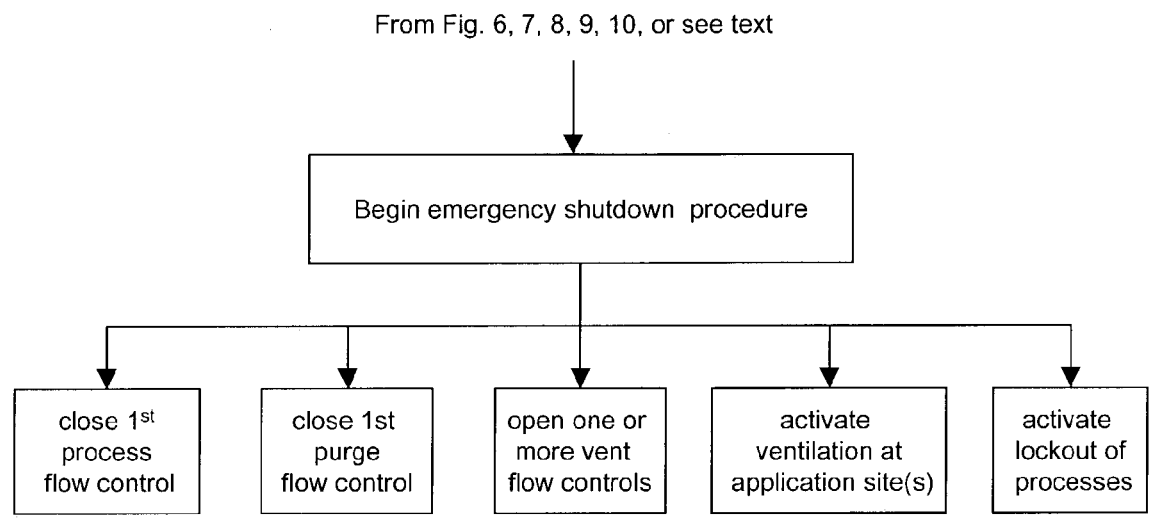
FIG. 5 depicts a flow chart of an emergency shutdown portion of the method of the invention.

FIG. 5 shows the emergency shutdown procedure that can be activated during system operation by indication of a leak or other system fault, which in one embodiment, includes closing the first process flow control (e.g., control 312). In another embodiment, the emergency shutdown procedure includes closing the first purge flow control (e.g., control 332). In another embodiment, the emergency shutdown procedure includes opening one or more vent flow controls, e.g., controls 346 or 348. In another embodiment, the emergency shutdown procedure includes activating the ventilation system, e.g., the ventilation system at sites 304 and 306. In still another embodiment, the emergency shutdown procedure includes entering a lock-down mode, wherein all processes are locked out and the system cannot be restarted without presenting authorization to the system configuration mode at initialization, e.g., by entering a service password, using a key, and the like. Furthermore, each application site is shut down, e.g., the second process flow control is closed and a shutdown signal is sent to any other application equipment at the application site. In a preferred embodiment, the emergency shutdown procedure includes closing the first process flow control, closing the first purge flow control, opening the first and second vent flow controls, activating the ventilation system at the application sites, and entering the system into lock-down mode.

In preferred embodiments, the following triggers independently activate the emergency shutdown procedure. One such trigger is indication of the presence of a leak from any of the preceding tests. Another trigger is when pressure at the third pressure sensor (e.g., sensor 342) is below a minimum pressure threshold. Another trigger occurs when the pressure differential measured between two or more sensors selected from the second, third and fourth pressure sensors (e.g., sensors 340, 342, and 344) is greater than a maximum pressure differential. For example, if sensor 342 senses pressure but 340 and 344 do not, flow control 312 may be malfunctioning. In another trigger, if all three sensors do not agree, at least one of the sensors is malfunctioning and maintenance is indicated. In another trigger, for pressure sensors that employ dual redundant pressure sensing elements, e.g., sensors 338 and 340, the microprocessor can conduct a parity test by sensing a pressure differential within the pair of pressure sensing elements. When that differential exceeds the maximum pressure differential, the sensor is malfunctioning and maintenance is indicated. Yet another trigger is when the microprocessor receives indication that the ventilation system at an application site (e.g., 304 or 306) is inoperative, i.e., that ventilation of accumulated process gas at the application is insufficient.

Figure 6:
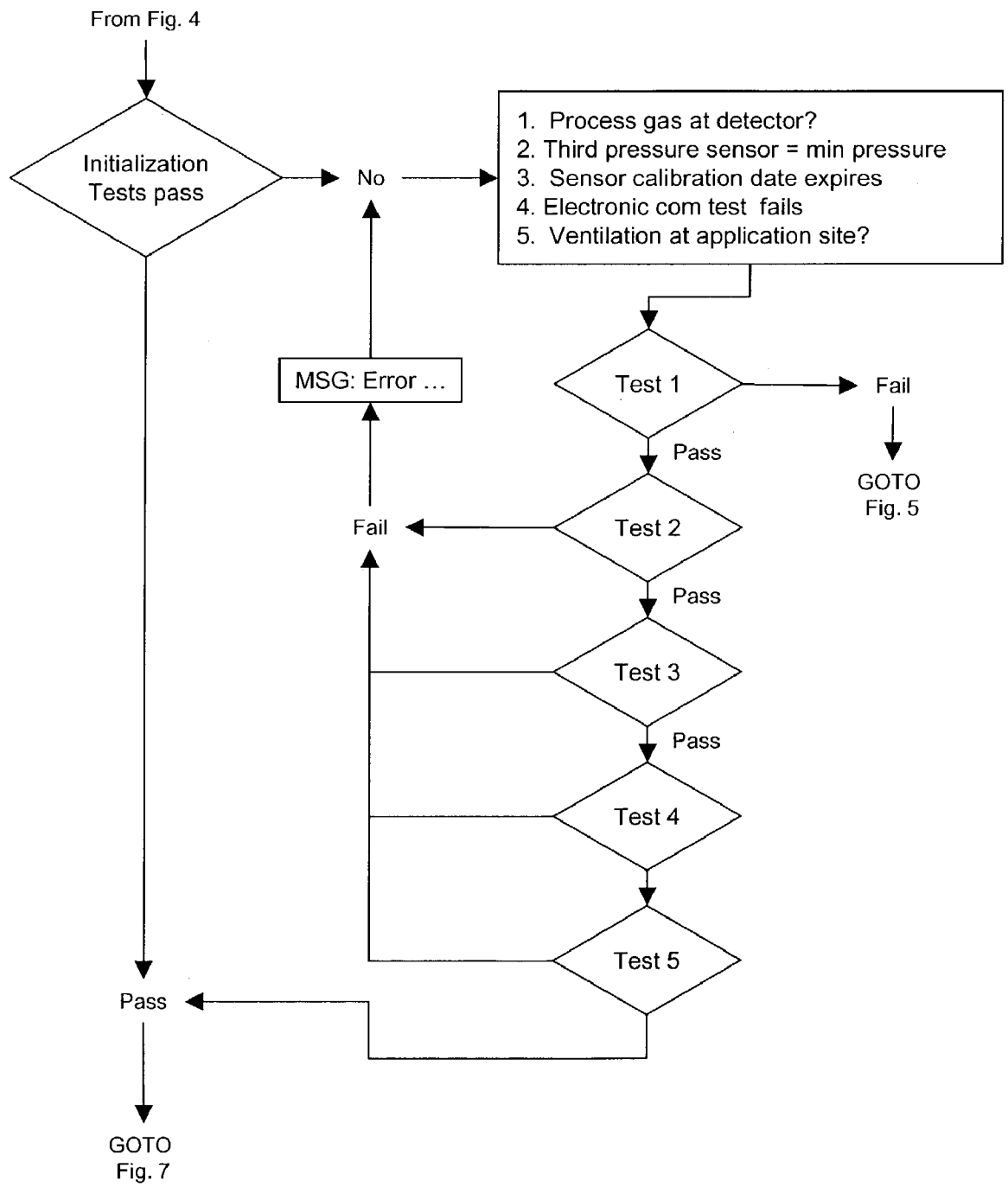
FIG. 6 depicts a flow chart of another initialization portion of the method of the invention.

FIG. 6 shows additional initialization test(s). In one embodiment, test 1 is included, which indicates a leak if a process gas signal at process gas detector 350 is greater than a maximum process gas signal. If test 2 fails, the system returns an error message, and performs the emergency shutdown procedure.

In another embodiment, test 2 is included, wherein the pressure at third pressure sensor (e.g., sensor 342) can be compared to a minimum pressure. When pressure at the third pressure sensor (e.g., sensor 342) is below a minimum pressure threshold, it can indicate the pressure of gas supplied by the process gas source (e.g., at site 308) is low, i.e., that the source is nearly empty or there is some other problem between the source and flow control 312, such as a leak. If test 2 fails, the system returns an error message and locks first flow control 312 closed until the pressure at the third sensor exceeds the minimum pressure.

In another embodiment, test 3 can be conducted to verify that microprocessor 354 is in electronic communication with the system components, for example, flow controls 312, 318, 320, 322, 324, 332, 334, 336, 346, 348, 314, 316; with pressure sensors 338, 340, 342, and 344; gas detector 350; and temperature sensor 352. If test 3 fails, the system returns an error message, or more preferably, performs the emergency shutdown procedure.

In another embodiment, test 4 can be conducted, wherein the current date or accumulated system run time is compared against a calibration date or calibration timeout for system components, for example, for pressure sensors 338 and 340. If test 4 fails, the system returns an error message, or more preferably, performs the emergency shutdown procedure.

In another embodiment, test 5 can be conducted, wherein microprocessor 354 checks the ventilation system at the application sites is operating and is providing sufficient ventilation. If test 4 fails, the system returns an error message, or more preferably, performs the emergency shutdown procedure.

In preferred embodiments, test 1 is included, or more preferably, test 1 and test 2, or even more preferably, test 1 and 2 and one of test 3, 4, or 5. Most preferably, tests 1 to 5 are included.

Figure 7:
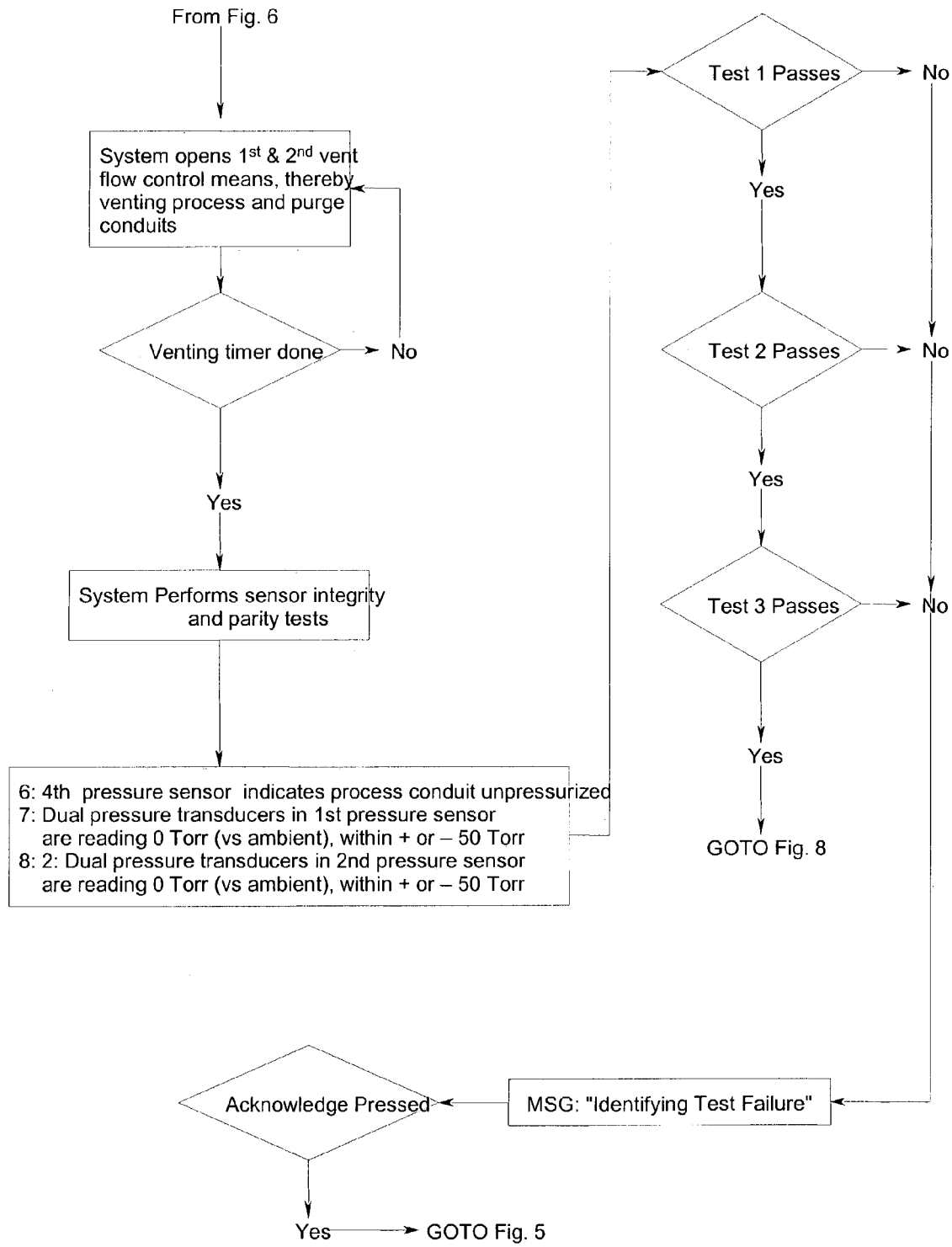
FIG. 7 depicts a flow chart of parity test of the method of the invention.

FIG. 7 shows additional initialization test(s). In a preferred embodiment, the system opens the first and second vent flow controls (e.g., controls 356 and 348), thereby venting process conduit 302 and purge conduit 326.

A number of pressure sensor tests can be conducted. In one embodiment, test 6 is conducted, wherein the pressure at the fourth pressure sensor (e.g., sensor 344) indicates that process conduit 302 is unpressurized (i.e., relative to ambient pressure). In test 7, a parity test is conducted between the dual pressure transducers in pressure sensor 340, wherein the test passes if the transducers indicate that process conduit 302 is unpressurized and the transducers agree to within about 50 Torr. In test 8, a parity test is conducted between the dual pressure transducers in pressure sensor 340, wherein the test passes if the transducers indicate that process conduit 302 is unpressurized and the transducers agree to within about 50 Torr. Upon failure of any of tests 6 to 8, the system returns an error message, or more preferably, performs the emergency shutdown procedure. In a preferred embodiment, tests 6 to 8 are conducted.

Figure 8:
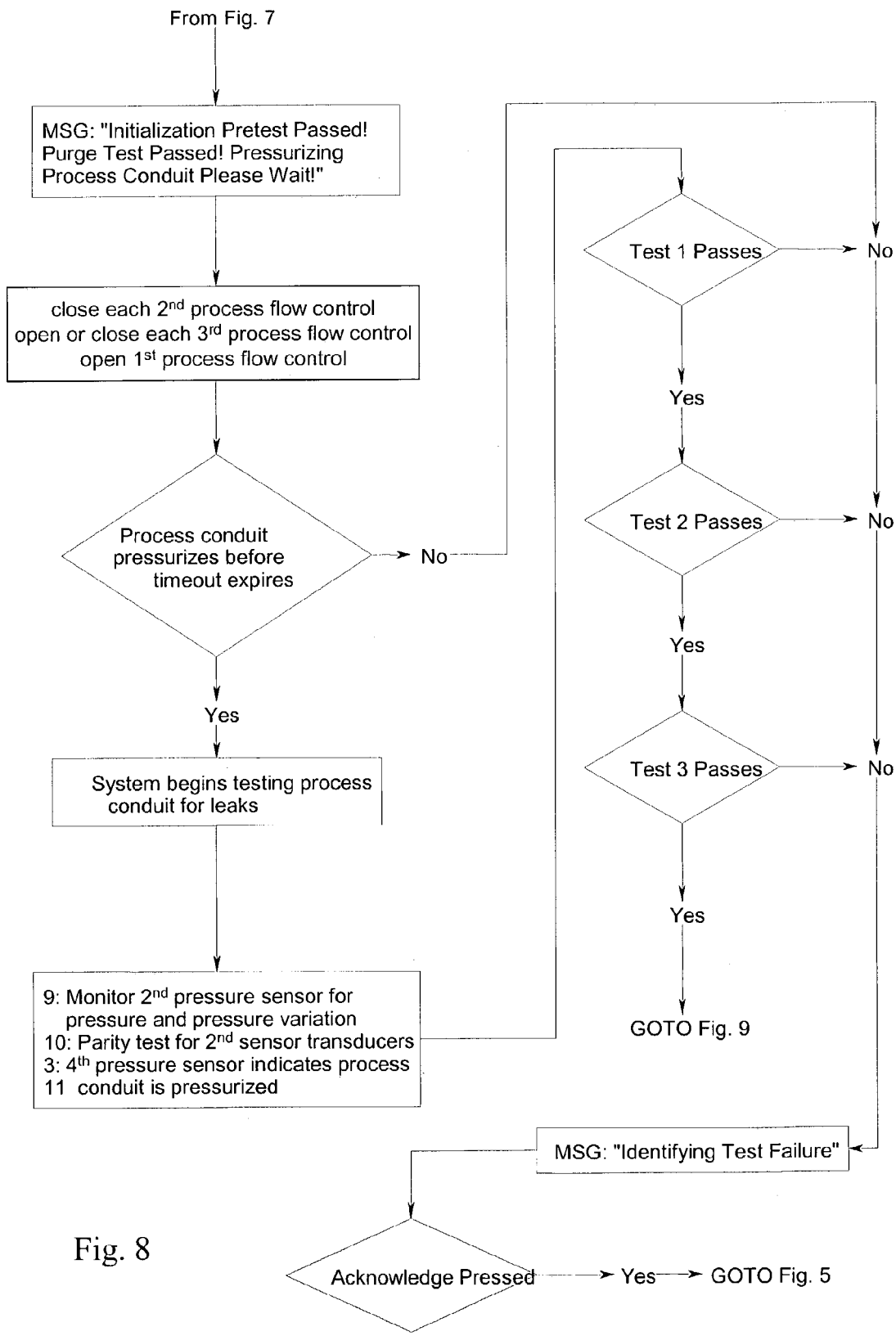
FIG. 8 depicts a flow chart of a process gas pressurization test portion of the method of the invention.

FIG. 8 shows an example of a pressurization test using process gas. Each second purge flow control, e.g., flow controls 334 and 336, is closed and first process flow control 312 is opened. The portion of conduit 302 leading to each application site can be pressurized independently, i.e., independently for each application site the third flow control (e.g., 322 or 324) is closed, or the third flow control (e.g., 322 or 324) is opened and the second flow control (e.g., 318 or 320) is closed. That is, the process conduit 302 can be pressurized from source 308 up to each third process flow control (e.g., 322 or 324), and the portion of conduit 302 from there to the second process flow control (e.g., 318 or 320) can be pressurized independently for each application. Thus, the separate portions of conduit 302 for each application can be tested independently.

The pressurization step includes comparing the time to reach a minimum stable pressure at the second pressure sensor (i.e., 340) or the fourth pressure sensor (i.e., 344) with a pressurization timeout value. The timeout value can be a preset limit or it can be calculated by the microprocessor based on the pressurizing volume (i.e., what portions of conduit 302 are being pressurized based on which third process flow controls are open or closed, as described in the preceding paragraph). Preferably, the timeout is a preset limit, and the third flow control for each application site is open during the pressurization test, i.e., the length of process conduit 302 from first process flow control 312 to each second process flow control (i.e., 318 and 320) is tested.

If the process conduit pressurizes to the stable minimum pressure before the timeout expires, a number of pressure sensor tests can be performed. In one embodiment, test 9 is conducted, wherein the pressure at the second pressure sensor (e.g., sensor 340) is monitored for pressure and pressure variation. If the pressure variation exceeds the maximum pressure variation value, the test fails. In another embodiment, in test 10, a parity test is conducted between the dual pressure transducers in pressure sensor 340, wherein the test passes if the transducers agree to within about 50 Torr. In another embodiment, in test 11, if the fourth pressure sensor indicates a pressure that is below a minimum pressure, the test fails. Upon failure of any of tests 9 to 11, the system returns an error message, or more preferably, performs the emergency shutdown procedure. In a preferred embodiment, tests 9 to 11 are conducted.

Figure 9:
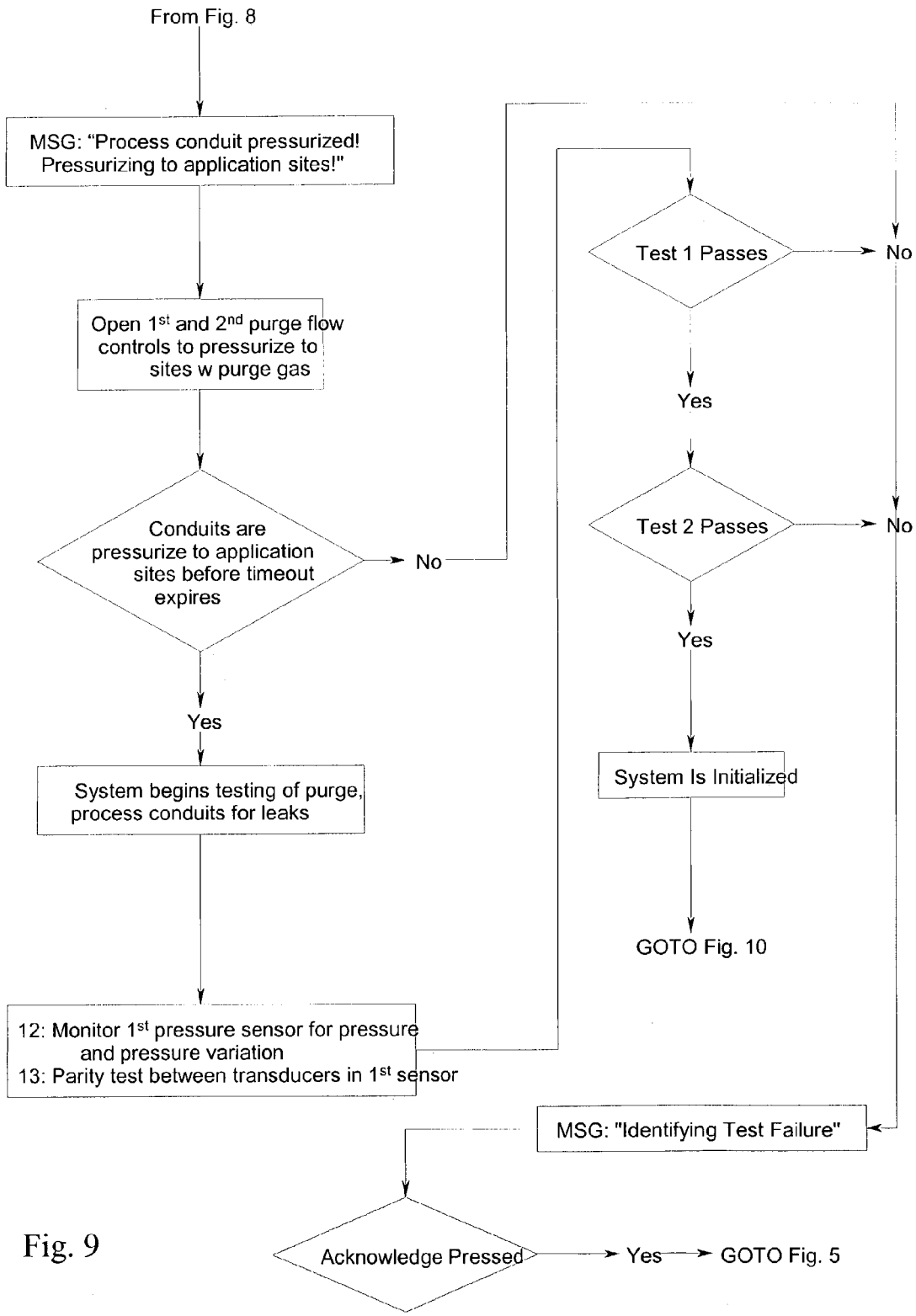
FIG. 9 depicts a flow chart of a purge gas pressurization test portion of the method of the invention.

FIG. 9 shows an example of a pressurization test using purge gas, wherein the first purge flow control 332 is opened. The portion of conduit 326 leading to each application site can be pressurized independently, i.e., independently for each application site the second purge flow control (e.g., 334 or 336) is closed, or the second purge flow control (e.g., 334 or 336) is opened and the third and second process flow controls for each application site (e.g., 318 and 322, or 320 and 324) are closed. That is, the purge conduit 326 can be pressurized from source 324 up to each second purge flow control (e.g., 334 or 336), and the portion of conduit 326 from there to each third and second process flow control for each application site (e.g., 318 and 322, or 320 and 324) can be pressurized independently for each application. Thus, the separate portions of conduit 326 for each application can be tested independently.

The pressurization step in FIG. 9 includes comparing the time to reach a minimum stable pressure at the first pressure sensor (i.e., sensor 338) with a pressurization timeout value. The timeout value can be a preset limit or it can be calculated by the microprocessor based on the pressurizing volume (i.e., what portions of conduit 326 are being pressurized based on which second purge flow controls are open or closed, as described in the preceding paragraph). Preferably, the timeout is a preset limit, and the second purge flow control for each application site is open during the pressurization test, i.e., the length of process conduit 326 from first purge flow control 332 to each second process flow control (i.e., 318 and 320) is tested.

In the pressurization test, the microprocessor 354 is further programmed to compare the time elapsed from commencing pressurization to attainment of a stable empirical pressure at the first pressure sensor 338 (for purge gas pressurization) or one or more of second, third, and/or fourth pressure sensors 340, 342, and 344 (for process gas pressurization) with a timeout value. When the timeout value expires before a stable pressure is attained at the respective sensor, the presence of a leak is indicated in the portion of the system being pressurized.

If the purge conduit pressurizes to a stable minimum pressure before the timeout expires, a number of pressure sensor tests can be performed. In one embodiment, test 12 is conducted, wherein the pressure at the first pressure sensor (e.g., sensor 338) is monitored for pressure and pressure variation. If the pressure variation exceeds the maximum pressure variation value, the test fails. In another embodiment, in test 13, a parity test is conducted between the dual pressure transducers in pressure sensor 338, wherein the test passes if the transducers agree to within about 50 Torr. Upon failure of either test 12 or 13, the system returns an error message, or more preferably, performs the emergency shutdown procedure. In a preferred embodiment, tests 12 and 13 are conducted.

Figure 10:
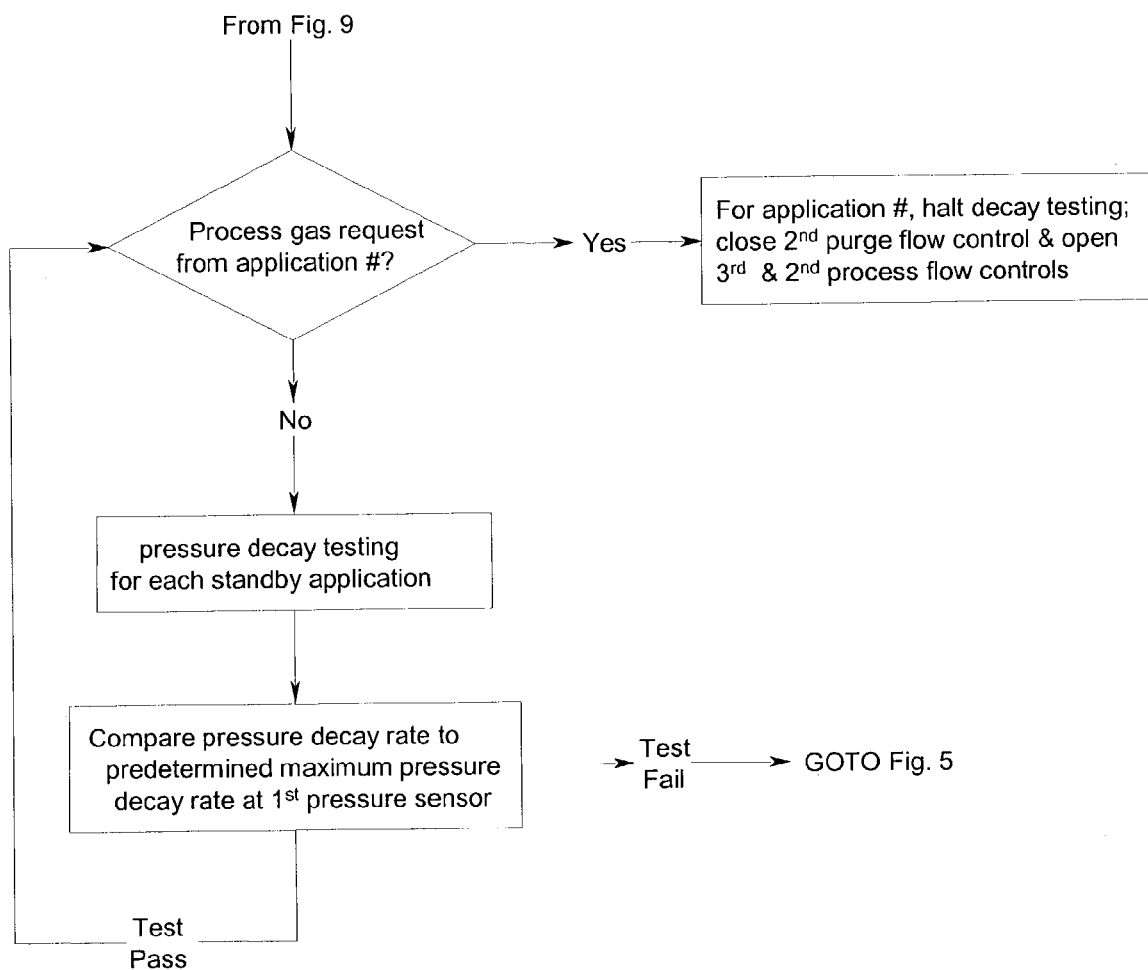
FIG. 10 depicts a flow chart of pressure decay test portion of the method of the invention.

FIG. 10 shows an example of microprocessor 354, responsive to a request from an application site (i.e., 304 or 306), directing process gas to the application site or conducting a pressure decay test.

For example, in response to process gas request from any application, (i.e., 304 or 306), the respective second purge flow control is closed (e.g., flow control 334 or 336) and the third and second process flow controls (e.g., 322 and 318 or 324 and 320) are opened. Preferably, while process gas is directed to the application site, test 10 is conducted, i.e., the first pressure sensor (i.e., sensor 340) is monitored for pressure variation and a leak is indicated when the pressure variation is greater than a maximum pressure variation, as described above for FIG. 8.

In response to an application standby request from any application site, the application site is no longer using process gas, microprocessor 354 is programmed to perform a pressure decay test. The test can be performed for the portion of conduit 326 between first purge flow control 332 and second purge flow controls 334 and 336, and independently for each application from flow controls 334 and 336 to the portion of conduit 302 bounded by the third and second process flow controls, e.g., between flow controls 318 and 322, or 320 and 324. The procedure involves for each application site, independently closing the second purge flow control (e.g., 334 or 336), or opening the second purge flow control and closing the third and second process flow controls (e.g., 318 and 322, or 320, and 324). Preferably at least one second purge flow control (e.g., 334 or 336) is opened. The portion of the system that can be defined by the preceding flow control settings is then pressurized with purge gas by opening the first purge flow control 332. When the pressure at pressure sensor 338 is at a minimum pressure, flow control 332 is closed. The microprocessor then compares an empirical pressure decay rate at pressure sensor 338 with a maximum pressure decay rate. When an empirical pressure decay rate is measured at sensor 338 that exceeds the maximum pressure decay rate, the presence of a leak is indicated.

Furthermore, microprocessor 354 is programmed to respond independently to an application operation or application standby request for each of at least two application sites. For example, process gas can be directed to application site 304 (i.e., controls 312, 322, and 318 are open and 334 is closed) while a pressure variation test (i.e., test 11) is conducted at the second pressure sensor (i.e., sensor 340), while at the same time, a pressure decay test is conducted for application site 306 (i.e., controls 320, 334, and 332 are closed, and 336 is open) where the conduit is pressurized with purge gas, and the pressure decay rate is measured at the first pressure sensor (i.e., sensor 338).

In the above tests, microprocessor 354 employs one or more limiting values selected from a timeout value, a minimum pressure value, a maximum pressure value, a maximum pressure variation value, and a maximum pressure decay rate value. These values can be supplied during programming as preset limits or as a set of values, for example, in a look-up table, or can be entered into the system by an operator, or can be calculated from characteristics of the system. In a preferred embodiment, at least one value selected from a timeout value, a minimum pressure value, a maximum pressure value, a maximum pressure variation value, and a maximum pressure decay rate is calculated by employing a gas temperature measured at the temperature sensor (e.g., sensor 352). In a more preferred embodiment, at least one of the preceding values is calculated by employing a gas temperature measured at the temperature sensor (e.g., sensor 352) and the pressure of the process gas (e.g., measured at sensors 340, 342, or 344).

The ability of the system to detect gas leakage can be related to its ability to detect decreases in pressure known to be greater than those that might be attributable to temperature variations and sensor inaccuracies.

Through the use of highly accurate pressure sensors and temperature monitoring devices, along with careful pipeline routing and insulation, one skilled in the art will be able to achieve a high sensitivity for the detection of small gas leaks in the system.

Pressure based leak detection in the system is based upon on the ideal gas law, $PV=nRT$, wherein P=pressure, V=volume, n=moles gas, R=universal gas constant and T=absolute temperature. When the amount of gas should be constant, e.g., during the pressure decay test, the pressure can still vary due to temperature variations. Using a reformulation of the ideal gas law, to place the pressure as a function of temperature, i.e., $P=nRT/V$, the expected pressure variation at the pressure sensor due to temperature can be calculated by employing the temperature value at the temperature sensor. Pressure variation beyond that expected due to temperature can thus indicate a leak. Given this equation we can monitor the amount of pressure decay which gives us a way to calculate the amount of gas leaked in a given time period.

As used herein, a gas source, for example, a process gas source located at process gas source site 104 can be a pressurized gas cylinder, boil-off from a liquid gas dewar, a delivered gas tanker or railcar, an onsite gas generation or recycle facility, and the like.

As used herein, process gas is any gas that is employed by a manufacturing process and is typically, is flammable (e.g., $H_2$), chemically reactive (e.g., HCl), a health hazard (e.g., a toxin such as CO or an asphyxiant such as a noble gas), costly (e.g., 99.995% pure $H_2$), or a combination. A process gas includes, for example, $H_2$, $O_2$, $O_3$, halogens (e.g., $F_2$, $Cl_2$, $ClF_3$, and the like), acids (e.g., HF, HCl, and the like), noble gases (e.g., He, Ne, Ar, Kr, Xe, and Rn), nitrogenous gases (e.g., $N_2$, $NH_3$, $NO_x$, $NF_3$, and the like), hydrocarbon or carbonaceous gases (e.g., CO, $CO_2$, C1–C4 aliphatic gases such as $CH_4$, cyclopropane, cyclobutane, ethylene oxide, $CH_2$=$CH_2$, $CH_2$=C=$CH_2$, and the like), halocarbons (e.g., $C_2F_6$, $C_2HF_5$, $CF_4$, $C_3F8$, $CHF_3$, $C_4F_8$, $CH_2F_2$, $C_3F_8$, $C_4F_8O$, $CH_3F$, and the like), boronic gases ($BF_3$, $BCl_3$, $B(CH_3)_3$, and the like), silicon, germanium, and arsenic gases (e.g., $SiF_4$, $SiCl_4$, $Si_2H_6$, $SiH_2Cl_2$, $SiH_3CH_3$, $SiHCl_3$, $GeF_4$, $AsH_3$, $AsF_5$, and the like), sulfurous gases ($H_2S$, $SO_2$, $SF_6$, and the like), and metal halides (e.g., $WF_6$, and the like). Also included are mixtures of two or more gases, for example, $F_2$/Kr/Ne, Kr/Ne, Ar/$O_2$, Ar/He, Ar/$CO_2$, Ar/$H_2$, He/$O_2$, $NO_x$/$O_2$, N2/$CO_2$, $N_2$/$O_2$, $N_2$/$H_2$, $N_2$/$CO_2$/He, CO/Ne, CO/He/$O_2$, $CO_2$/ethylene oxide, ethylene oxide/halocarbon, and the like. Preferably, the process gas is hydrogen.

Purge gas is any gas that can be used by the system to perform leak testing and to purge the system of process gas and/or contaminants. A purge gas can be any of the above gases, or more typically, is a relatively non-reactive gas or mixture such as a noble gas, $N_2$, $CO_2$, compressed air, and the like. Preferably, a purge gas is $N_2$, Ar, or He, or most preferably, He.

As used herein, an application, for example, an application at application sites 106, 304, and 306, is any process that employs a process gas, for example, a laser (e.g., $N_2$, He, $CO_2$ and the like), welding or cutting processes (e.g., gas metal arc welding, flux cored arc welding, tungsten arc welding, plasma arc welding, laser beam welding, plasma arc cutting, oxyfuel cutting, laser beam cutting and the like), deposition processes (e.g., plasma spray coating using $H_2$ or chemical vapor deposition using $SiH_4$), sterilization (e.g., sterilization using ethylene oxide or $O_3$), heat transfer (e.g., $CO_2$, $NH_3$, or halocarbons employed as refrigerant fluids), cleaning and solvent extraction (e.g., halocarbons, supercritical $CO_2$, and the like), fire suppression (e.g., $CO_2$ or halocarbons), semiconductor manufacturing (e.g.; HF etching, $AsF_5$ doping, crystal growth using $GeH_4$ or $SiH_4$), recovery and recycle systems for furnace operations (e.g., $H_2$ or $CO_2$), chemical, food, pharmaceutical or refining operations involving synthesis, processing or analysis, (e.g., $H_2$ for hydrogenation or $CO_2$ for carbonation). Typically, an application is a manufacturing process such as welding, cutting, deposition, or semiconductor manufacturing. Preferably, the application is plasma thermal spray coating.

As used herein, a flow control, for example, flow controls 108, 110, 116, 312, 318, 320, 322, 324, 332, 334, 336, 346, 348, 314, and 316 can be one or more fluid flow control elements, e.g., a butterfly valve, a gate valve, a needle valve, a direct operating spool valve, a direct lift pilot operated valve, and the like. As used herein, a direct lift pilot operated valve is a valve that defaults to a closed state, i.e., closed to gas flow, when the valve is unpowered. More preferably, one or more flow controls employ two flow control elements in series, whereby the flow control is redundant, as shown in FIG. 3B. Even more preferably, each flow control employs at least one direct lift pilot operated valve, and still more preferably, one or more flow controls employ redundant, i.e., at least two, direct lift pilot operated valves in series. Most preferably, a flow control employs two direct lift pilot operated valves in series, coupled with a check valve, whereby gas can flow in only one direction through the flow control. When a flow control employs a redundant valves in series, for example, in a preferred embodiment where the first process flow control, each said third process flow control, and the first purge flow control each employ a pair of direct lift pilot operated valves in series, the microprocessor is programmed to close one valve in the pair upon detecting that the other valve in the pair is malfunctioning, As used herein, "opening" or "closing" a flow control includes directing the flow control to open or close, respectively, with regard to gas flow, or verifying the flow control is open or closed to gas flow. For example, in the case of an open flow control, "closing" includes actuating the open flow control until it is closed. In the case where the flow control is already closed, "closing" includes verifying that it is closed without necessarily actuating it. Furthermore, flow controls that include a check valve, for example, 322 and 324 in a particular embodiment, can be considered "closed" by definition in the direction contrary to the check valve. Verifying the open/closed state of a flow control can include sending the appropriate actuation command, interrogating the flow control to determine the open/closed state, receiving a signal from the flow control indicating the open/closed state, determining the open/closed state from a stored value representing the last known actuation command, determining the open/closed state logically from the pressure at a pressure sensor, and the like.

As used herein, a pressure sensor, e.g., a pressure sensor such as 118, 338, 340, 342, and 344, is one or more pressure sensing elements, for example, a pressure switch, a pressure transducer, an ionization gauge, and the like. More preferably, a pressure sensor is two pressure sensing elements in parallel, i.e., exposed to the same gas pressure, whereby the pressure sensor is redundant. Most preferably, the pressure sensors represented by sensors 342 and 344 are pressure switches and the sensors represented by sensors 338 and 340 each employ two pressure transducers in parallel.

As used herein, a programmable microprocessor, e.g., microprocessors 120 or 354, is any general purpose or purpose built processor that can be programmed to conduct the method of the invention. The microprocessor can be a general-purpose computer, e.g., a desktop computer, a single board computer, e.g., an embedded processor, and the like.

As used herein, "electronic communication" indicates that the microprocessor is in one-way or two way communication with an element of the system, i.e., the microprocessor can read data from, and/or send data and commands to the element. "Electronic communication" can be implemented in a hard-wired electrical connection, e.g., a shielded cable, or an optical connection, e.g., an optical fiber, a wireless communication, e.g., infrared or radiowaves, a combination thereof, and the like.

As used herein, a process manifold is any flow element by which a conduit can split into multiple streams. A manifold can be a passive "T" or "Y" junction, a manifold with multiple arms, an active manifold such as a three-way valve, and the like.

Those of ordinary skill in the art should recognize that methods involved in a controlling a system such as system 100 or 300 can be embodied in a computer program product that includes a computer usable medium for use by the microprocessor. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for integrated gas delivery and leak detection, comprising:
   a) at least one application site;
   b) a process conduit extending from a process gas source site to the application site;
   c) a first process flow control at the process conduit;
   d) a second process flow control at the process conduit between the first process flow control and the application site;
   e) a first pressure sensor located at the process conduit between the first and second process flow controls;
   f) a microprocessor that is in electronic communication with the first and second process flow controls and the first pressure sensor, wherein the microprocessor is programmed to respond to an application standby request by performing a pressure decay test, including:
      closing the second process flow control;
      pressurizing a portion of the system by opening the first process flow control; and
      when the pressure at the first pressure sensor is at a minimum pressure, closing the first process flow control, and comparing an empirical pressure decay rate at the first pressure sensor with a maximum pressure decay rate, whereby an empirical pressure decay rate that exceeds the maximum pressure decay rate indicates the presence of a leak; whereby the amount of pressure decay is monitored using the equation $P=nRT/V$ in which the pressure variation at the first pressure sensor due to temperature is calculated, wherein $P$=pressure, $V$=volume, $n$=moles gas, $R$=universal gas constant and $T$=absolute temperature;
   g) a purge conduit extending from a purge gas source site to the process conduit between the first and second process flow controls; and
   h) a first purge flow control located at the purge conduit;
   wherein:
      the purge flow control is in electronic communication with the microprocessor;
      the first pressure sensor is located at the purge conduit between the first purge flow control and the process conduit, or at the process conduit between the first and second process flow controls; and
      the pressure decay test includes:
         pressurizing a portion of the system by opening the first process flow control and closing the first purge flow control; or opening the first purge flow control and closing the first process flow control; and
         when the pressure at the first pressure sensor is at a minimum pressure, closing the first process and the first purge flow controls;
      thereby providing integrated gas delivery and leak detection.

2. The system of claim 1, wherein the microprocessor is further programmed to perform a pressurization test, including:
   pressurizing a portion of the system by:
      closing the second process and the first purge flow controls and opening the first process flow control; or
      closing the first and second process flow controls and opening the first purge flow control; and
      comparing a timeout value to elapsed time from the beginning of the pressurizing step to attainment of a stable empirical pressure at the first pressure sensor, whereby expiration of the timeout value before attainment of a stable empirical pressure at the first pressure sensor indicates the presence of a leak; and
   closing the first process flow control when the presence of a leak is indicated.

3. The system of claim 2, whereupon completing system initialization, the microprocessor is programmed to perform the pressurization test.

4. The system of claim 3, wherein the microprocessor is further programmed to respond to an application operation request by:
   directing process gas to the application by closing the first purge flow control and opening the first and second process flow controls; and
   performing a pressure variation test while process gas is directed to the application by comparing an empirical pressure variation at the first pressure sensor with a maximum pressure variation value, whereby an empirical pressure variation that exceeds the maximum pressure variation value indicates the presence of a leak.

5. The system of claim 4, further including a first vent flow control, wherein:
   the first vent flow control is in:
      electronic communication with the microprocessor;
      fluid communication with the process or the purge conduit; and
   the microprocessor is programmed to open the vent flow control upon indication of the presence of a leak.

6. The system of claim 5, further including:
   a third process flow control at the process conduit between the first process flow control and the purge conduit;
   a second pressure sensor located at the process conduit between the first and the third process flow controls, wherein the second pressure sensor is in electronic communication with the microprocessor; and
   wherein the first pressure sensor is located at the purge conduit between the first purge flow control and the process conduit, or at the process conduit between the second and the third process flow controls.

7. The system of claim 6, wherein the pressure decay test further includes closing the third process flow control.

8. The system of claim 7, wherein the pressure decay test further includes:
   closing the first process flow control when the pressure at the second pressure sensor is at a minimum pressure; and
   comparing an empirical pressure decay rate at the second pressure sensor with a maximum pressure decay rate, whereby an empirical pressure decay rate that exceeds the maximum pressure decay rate indicates the presence of a leak.

9. The system of claim 8, wherein the pressurization test further includes closing the third process flow control.

10. The system of claim 9, wherein the pressurization test further includes comparing a timeout value to the time elapsed from the beginning of the pressurizing step to attainment of a stable empirical pressure at the second pressure sensor, whereby expiration of the timeout value before attainment of a stable empirical pressure at the second pressure sensor indicates the presence of a leak.

11. The system of claim 10, further including:
at least two said application sites;
a process manifold located at the process conduit downstream of the first process flow control, whereby the process conduit extends separately to each said application site, wherein for each said application site one said third and one said second process flow control are located on the process conduit between the process manifold and the application site;
wherein
the first pressure sensor is located at the purge conduit between the first purge flow control and the process conduit; and
the second pressure sensor is located upstream of the process manifold.

12. The system of claim 11, further including a purge manifold located at the purge conduit downstream of the first pressure sensor, wherein for each said application site:
the purge conduit extends to the process conduit between the second and third process flow control; and
further including a second purge flow control located on the purge conduit between the purge manifold and the process conduit.

13. The system of claim 12, wherein the pressure variation test further includes:
independently for each said application site, closing the second purge flow control and opening the third process flow control; and
comparing empirical pressure variation at the second pressure sensor with a maximum pressure variation value, whereby an empirical pressure variation at the second pressure sensor that exceeds the maximum pressure variation value indicates the presence of a leak.

14. The system of claim 13, wherein the microprocessor is programmed to independently respond to an application operation or application standby request for each of at least two said application sites.

15. The system of claim 14, further including at least one temperature sensor in electronic communication with the microprocessor, wherein:
the temperature sensor is located at one said conduit; and
the microprocessor is further programmed to:
measure a gas temperature at the temperature sensor; and
employ the gas temperature in calculating at least one value selected from a timeout value, a minimum pressure, a maximum pressure, a maximum pressure variation, and a maximum pressure decay rate.

16. The system of claim 15, further including a process gas detector, wherein:
the detector is located external to the process conduit;
the detector is in electronic communication with the microprocessor; and wherein the microprocessor is further programmed to compare an empirical process gas signal at the detector with a maximum process gas signal, whereby an empirical process gas signal at the detector that exceeds the maximum process gas signal indicates the presence of a leak.

17. The system of claim 16, further including:
two additional pressure sensors in electronic communication with the microprocessor, including:
a third pressure sensor at the process conduit between the process source and the first process flow control;
a fourth pressure sensor at the process conduit between the first and third process flow controls; and
whereupon sensing:
a pressure at the third pressure sensor that is below a minimum pressure; or
a pressure differential measured between two or more sensors selected from the second, third and fourth pressure sensors is greater than a maximum pressure differential;
the microprocessor is programmed to close the first process flow control.

18. The system of claim 17, wherein at least one said pressure sensor employs a pair of pressure transducers in parallel, whereupon sensing a pressure differential between said transducers that is greater than a maximum pressure differential, the microprocessor is programmed to close the first process flow control.

19. The system of claim 18, wherein the microprocessor is in electronic communication with a ventilation system at said application sites, whereupon detecting that the ventilation system is inoperative, the microprocessor is programmed to close the first process flow control.

20. The system of claim 19, wherein the first process flow control, each said third process flow control, and the first purge flow control each employ a pair of direct lift pilot operated valves in series, whereupon detecting that at least one said valve is malfunctioning, the microprocessor is programmed to close the other said valve in said pair.

21. The system of claim 20, wherein each said third process flow control includes a check valve, whereby purge gas is excluded from each said third process flow control.

22. The system of claim 21, wherein the first vent flow control is in fluid communication with the process conduit between the process gas source site and the process manifold, further including a second vent flow control that is in fluid communication with the purge conduit between the purge gas source site and the purge manifold; and
in electronic communication with the microprocessor;
wherein the microprocessor is further programmed to open the second vent flow control when the presence of a leak is indicated.

23. A method for integrating leak detection in a gas delivery system, comprising the steps of:
employing a gas delivery apparatus, comprising a process conduit extending from a process gas source site to at least one application site, at least two process flow controls, at least one pressure sensor, and a microprocessor;
employing a microprocessor to control the apparatus to respond to an application standby request by performing a pressure decay test, comprising:
closing a second process flow control;
pressurizing a portion of the apparatus by opening a first process flow control, and closing the first process flow control when the pressure at a first pressure sensor is at a minimum pressure; and comparing an empirical pressure decay rate at a first pressure sensor with a maximum pressure decay rate, whereby an empirical pressure decay rate that exceeds the maximum pressure decay rate indicates the presence of a leak; whereby the amount of pressure decay is monitored using the equation P=nRT/V in which the pressure variation at the first pressure sensor due to temperature is calculated, wherein P=pressure, V=volume, n=moles gas, R=universal gas constant and T=absolute temperature;

the apparatus further comprises a purge conduit extending from a purge gas source site to the process conduit, and at least one purge flow control; and the pressurizing step in the pressure decay test further comprises:
 opening the first process flow control and closing a first purge flow control; or
 opening the first purge flow control and closing the first process flow control; and closing the first process and the first purge flow controls when the pressure at the first pressure sensor is at a minimum pressure;

thereby testing the gas delivery apparatus for leaks.

24. The method of claim 23, wherein the pressure decay test further includes:
 pressurizing a portion of the apparatus by:
  closing the second process and the first purge flow controls and opening the first process flow control; or
  closing the first and second process flow controls and opening the first purge flow control; and
 comparing a timeout value to elapsed time from the beginning of the pressurizing step to attainment of a stable empirical pressure at the first pressure sensor, whereby expiration of the timeout value before attainment of a stable empirical pressure at the first pressure sensor indicates the presence of a leak; and
 closing the first process flow control when the presence of a leak is indicated.

25. The method of claim 24, further including employing the microprocessor to perform the pressurization test upon completing system initialization.

26. The method of claim 25, further including employing the microprocessor to respond to an application operation request by:
 directing process gas to the application by closing the first purge flow control and opening the first and second process flow controls; and
 performing a pressure variation test while process gas is directed to the application by comparing an empirical pressure variation at the first pressure sensor with a maximum pressure variation, whereby an empirical pressure variation that exceeds the maximum pressure variation indicates the presence of a leak.

27. The method of claim 26, wherein the apparatus comprises at least one vent flow control, further including employing the microprocessor to open the vent flow control upon indication of the presence of a leak.

28. The method of claim 27, wherein the apparatus comprises a third process flow control and a second pressure sensor; further including employing the microprocessor to close the third process flow control during the pressure decay test.

29. The method of claim 28, wherein the pressure decay test further includes employing the microprocessor to:
 close the first process flow control when the pressure at the second pressure sensor is at a minimum pressure; and
 compare an empirical pressure decay rate at the second pressure sensor with a maximum pressure decay rate, whereby an empirical pressure decay rate that exceeds the maximum pressure decay rate indicates the presence of a leak.

30. The method of claim 29, further including employing the microprocessor to close the third process flow control during the pressurization test.

31. The method of claim 30, wherein the pressurization test further includes employing the microprocessor to compare a timeout value to the time elapsed from the beginning of the pressurizing step to attainment of a stable empirical pressure at the second pressure sensor, whereby expiration of the timeout value before attainment of a stable empirical pressure at the second pressure sensor indicates the presence of a leak.

32. The method of claim 31, wherein the apparatus further includes:
 at least two said application sites; and
 a process manifold located at the process conduit downstream of the first process flow control, whereby the process conduit extends separately to each said application site, wherein for each said application site one said third and one said second process flow control are located on the process conduit between the process manifold and the application site;
wherein
 the first pressure sensor is located at the purge conduit between the first purge flow control and the process conduit; and
 the second pressure sensor is located upstream of the process manifold.

33. The method of claim 32, wherein the apparatus further includes a purge manifold located at the purge conduit downstream of the first pressure sensor, wherein for each said application site:
 the purge conduit extends to the process conduit between the second and third process flow controls; and
 further including a second purge flow control located on the purge conduit between the purge manifold and the process conduit.

34. The method of claim 33, wherein the pressure variation test further includes employing the microprocessor to:
 independently for each said application site, close the second purge flow control and open the third process flow control; and
 compare empirical pressure variation at the second pressure sensor with a maximum pressure variation, whereby an empirical pressure variation at the second pressure sensor that exceeds the maximum pressure variation indicates the presence of a leak.

35. The method of claim 34, further including employing the microprocessor to independently respond to an application operation or application standby request for each of at least two said application sites.

36. The method of claim 35, wherein the apparatus further includes at least one temperature sensor in electronic communication with the microprocessor, wherein the temperature sensor is located at one said conduit, and further including employing the microprocessor to:
 measure a gas temperature at the temperature sensor; and
 employ the gas temperature in calculating at least one value selected from a timeout value, a minimum pressure, a maximum pressure, a maximum pressure variation, and a maximum pressure decay rate.

37. The method of claim 36, wherein the apparatus further includes a process gas detector, wherein:
the detector is located external to the process conduit;
the detector is in electronic communication with the microprocessor; and
further including employing the microprocessor to compare an empirical process gas signal at the detector with a maximum process gas signal, whereby an empirical process gas signal at the detector that exceeds the maximum process gas signal indicates the presence of a leak.

38. The method of claim 37, wherein the apparatus further comprises two additional pressure sensors, further including employing the microprocessor to close the first process flow control upon sensing:
a pressure at the third pressure sensor that is below a minimum pressure; or
a pressure differential measured between two or more sensors selected from the second, third and fourth pressure sensors is greater than a maximum pressure differential.

39. The method of claim 38, wherein at least one said pressure sensor employs a pair of pressure transducers in parallel, further including employing the microprocessor to close the first process flow control upon sensing a pressure differential between said transducers that is greater than a maximum pressure differential.

40. The method of claim 39, wherein the microprocessor is in electronic communication with a ventilation system at said application sites, further including employing the microprocessor to close the first process flow control upon detecting that the ventilation system is inoperative.

41. The method of claim 40, wherein the first process flow control, each said third process flow control, and the first purge flow control each employ a pair of direct lift pilot operated valves in series, further including employing the microprocessor, upon detecting that at least one said valve is malfunctioning, to close the other said valve in said pair.

42. A computer program product for integrating leak detection in a gas delivery apparatus, comprising a computer usable medium including computer readable code thereon, wherein the code comprises instructions for causing a microprocessor to perform a pressure decay test in response to an application standby request, including;
closing a second process flow control;
pressurizing a portion of the apparatus by:
opening a first process flow control and closing a first purge flow control; or
opening the first purge flow control and closing the first process flow control; and
when the pressure at a first pressure sensor is at a minimum pressure, closing the first process and the first purge flow controls, and
comparing an empirical pressure decay rate at the first pressure sensor with a maximum pressure decay rate, whereby an empirical pressure decay rate that exceeds the maximum pressure decay rate indicates the presence of a leak; and
wherein the gas delivery apparatus comprises a process conduit extending from a process gas source site to at least one application site, the first and second process flow controls located at the process conduit, a purge conduit extending from a purge gas source site to the process conduit, the pressure sensor, and the microprocessor.

* * * * *